United States Patent
Kessler et al.

[15] 3,637,291
[45] Jan. 25, 1972

[54] DISPLAY DEVICE WITH INHERENT MEMORY

[72] Inventors: Clarence W. Kessler; Theodore T. Trzaska, both of Dayton, Ohio

[73] Assignee: The National Cash Register Company, Dayton, Ohio

[22] Filed: Feb. 11, 1970

[21] Appl. No.: 10,522

[52] U.S. Cl. ........................... 350/160, 40/28, 40/52
[51] Int. Cl. ........................... G02f 1/28, G09f 11/00
[58] Field of Search .................. 350/160; 40/28, 52

[56] References Cited

UNITED STATES PATENTS 3,529,156  9/1970  Fergason et al. ........................ 350/160
3,322,485  5/1967  Williams ................................ 350/160

OTHER PUBLICATIONS

"Liquid Crystals Track Flaws in a Colorful Way," J. A. Mock; Materials Engineering; pp. 66–67; Feb. 1969.

Primary Examiner—Ronald L. Wibert
Assistant Examiner—J. P. McGraw
Attorney—Louis A. Kline, Albert L. Sessler, Jr. and Elmer Wargo

[57] ABSTRACT

A visual display device utilizing encapsulated liquid crystals as the image-containing medium, the encapsulated liquid crystals evidencing two chromatic states; i.e., a first translucent state and a second opaque state.

The encapsulated liquid crystals serve as the image-containing medium (display screen) of the display device, and writing is accomplished by first rendering the encapsulated liquid crystals translucent by the application of a momentary electrostatic field and the erasing of selected areas of translucency by raising the temperature of selected areas of the encapsulated liquid crystals by the selective application of heat and allowing the subsequent cooling thereof, thereby transposing the selected translucent areas into opaque areas. The temperature must be sufficient to cause the transition of the encapsulated liquid crystals into an isotropic liquid. The point at which this transition occurs is known as the clear point. The images manifest themselves in the eyes of a viewer as a color, the color being determined by the wavelength of the incident light reflected by the opaque areas.

5 Claims, 4 Drawing Figures

PATENTED JAN 25 1972 3,637,291

INVENTORS
CLARENCE W. KESSLER &
THEODORE T. TRZASKA

BY *Louis A. Kline*
*Albert L. Sessler*

THEIR ATTORNEYS

INVENTORS
CLARENCE W. KESSLER &
THEODORE T. TRZASKA

THEIR ATTORNEYS

DISPLAY DEVICE WITH INHERENT MEMORY

BACKGROUND OF THE INVENTION

1. Field of the Invention

This invention relates to a visual display device which utilizes, for the display screen, a layer of encapsulated liquid crystals capable of exhibiting two stable chromatic states; i.e., a translucent state upon being momentarily subjected to an electrostatic field, and an opaque state upon being momentarily exposed to heat and the subsequent cooling thereof.

2. Description of the Prior Art

A great deal of the prior art concerned with visual displays is found to be directed to electroluminescent display devices utilizing phosphors and display devices of the gas discharge type. Obviously, the shortcomings in these devices are short life, power losses, high cost, and poor readability. With these shortcomings in mind, various workers in the display art have proposed the use of thermochromic materials (i.e., liquid crystals) as the display medium for use in visual display devices as an alternative to display devices which utilize phosphors and gas discharge tubes. The term "liquid crystal," as used herein, refers to a state of matter which exhibits the flow properties of a liquid and the long-range ordering characteristics of a crystal, characteristics most often demonstrated by esters of cholesterol. It is known that liquid crystals, when heated or cooled near their melting point, have the property of reflecting incident light, thereby assuming an iridescent appearance. Utilizing these properties, images can be written on the liquid crystal display medium by heating selected areas of the liquid crystal material. The light-reflecting property is manifested in the eyes of a viewer as a color, the color depending upon the temperature and the composition of the liquid crystal material used, and also upon the wavelength of the incident light. These colors, it was found, could be utilized for the display of information when viewed under normal light conditions. Visual display devices utilizing thermochromic materials capable of changing their light-reflecting properties with a change in temperature are exemplified in the following U.S. Pat. Nos. 3,323,241, June 6, 1967 to John W. Blair et al., 3,354,565, Nov. 28, 1967 to Stephen P. Emmons et al., 3,401,262, Sept. 10, 1968 to James L. Fergason et al., 3,410,999, Nov. 12, 1968 to James L. Fergason et al.

Generally, the erasure of the image, in the prior art, is automatically accomplished by removal of the heat and the subsequent cooling of the liquid crystals. It is therefore necessary in the prior art to continuously apply energy to the liquid crystal material in order to display the images for extended periods of time, since the change in the light-reflecting property is not stable. It can be seen that devices of this kind have no memory of any consequence and require power for the continuous display of information.

Applicants, realizing the need for an inexpensive high-resolution display device with permanent memory, have invented a display device incorporating the above advantages. The instant display also experiences very low heat loss and long life.

SUMMARY OF THE INVENTION

This invention utilizes encapsulated liquid crystals for the image-containing medium. The liquid crystals used are a particular class of materials found in the cholesteric family, which, when encapsulated, acquire the property of becoming translucent under the influence of an electric field, a state which is essentially preserved upon the removal of the electric field. The encapsulated liquid crystals also have the property of being rendered opaque upon exposure to heat sufficient to raise the temperature to the clear point of the encapsulated liquid crystals and the subsequent cooling thereof. This opaque state is essentially preserved subsequent to the cooling thereof.

A plurality of thin high-resistance film-heating electrodes are fabricated on a heat-resistant substrate and are blanketed by a thin insulating layer of glass. A conductive layer of tantalum is uniformly deposited over the glass layer. The tantalum layer, which is in opposed relation with the glass layer, is oxidized and covered with a layer of encapsulated liquid crystals. A transparent conductor is placed over the encapsulated liquid crystal layer. The conductive layer of tantalum and the transparent conductor serve as the field electrodes for rendering the encapsulated liquid crystal material translucent. The heating electrodes are the means by which the temperatures of selected areas of the encapsulated liquid crystals are raised above their clear point.

Writing is accomplished by first momentarily subjecting the entire encapsulated liquid crystal layer to an electric field, thereby rendering the display screen translucent. The display screen will appear dark in color, since a greater portion of the incident light will pass through the encapsulated liquid crystal layer and be absorbed by the oxidized tantalum layer. The images are written into the medium by energizing selected heating elements, thereby raising the temperature of the encapsulated liquid crystals immediately adjacent to the selected heating elements above their clear point. Upon cooling, the selected areas become and remain essentially opaque, thus resulting in a visible display, the display being further accentuated by the dark oxidized tantalum surface, which is discernible through the areas of the display screen which remain translucent.

DESCRIPTION OF THE PREFERRED EMBODIMENTS

Figure 1:
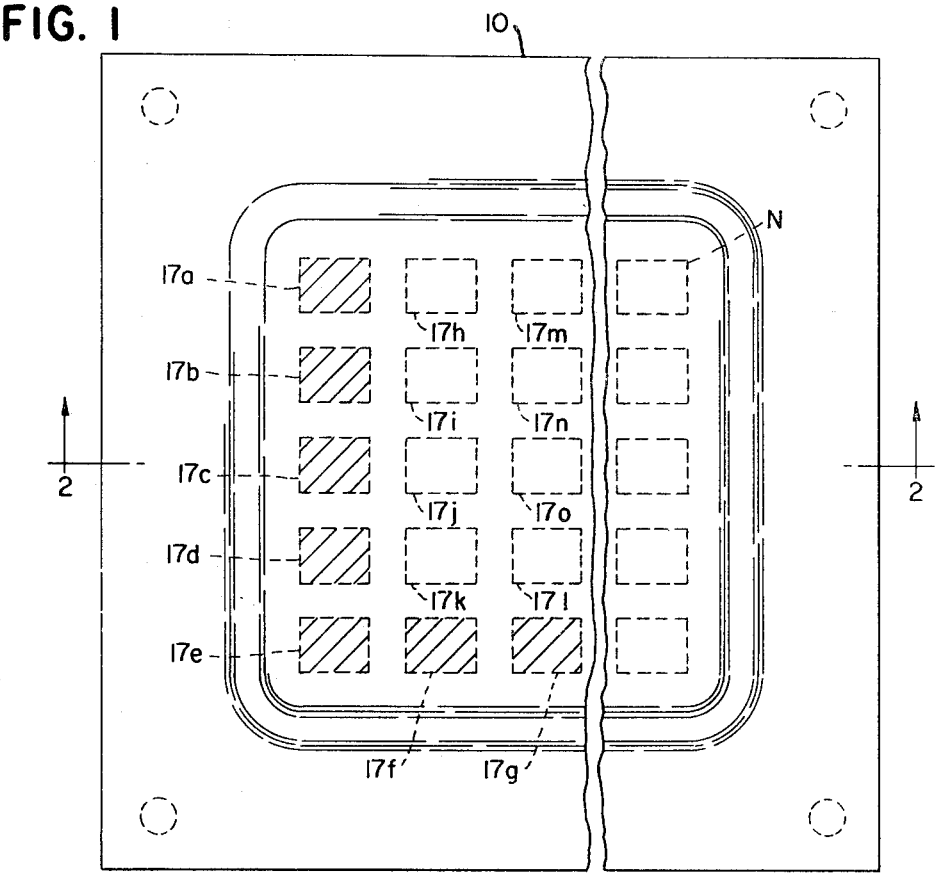
FIG. 1 is a front view of a display device in accordance with the invention.
Figure 2:
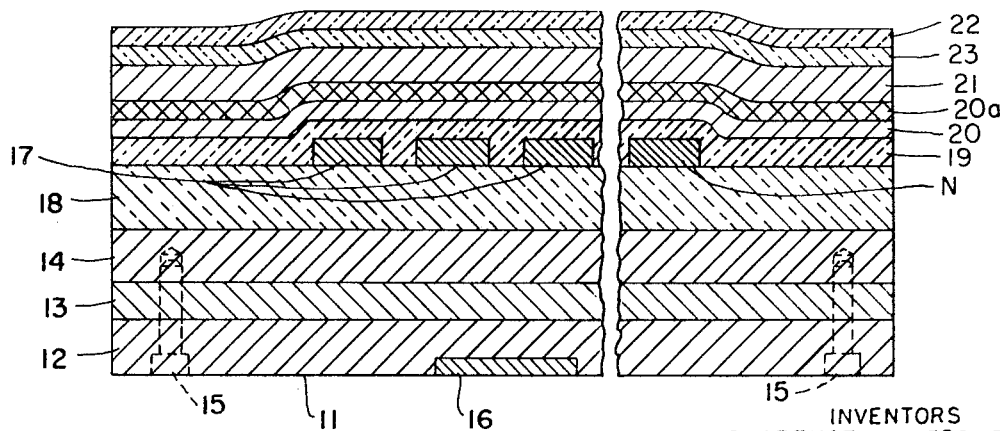
FIG. 2 is a sectional view of the structure illustrated in FIG. 1, taken along the line 2—2 in FIG. 1.
Figure 4:
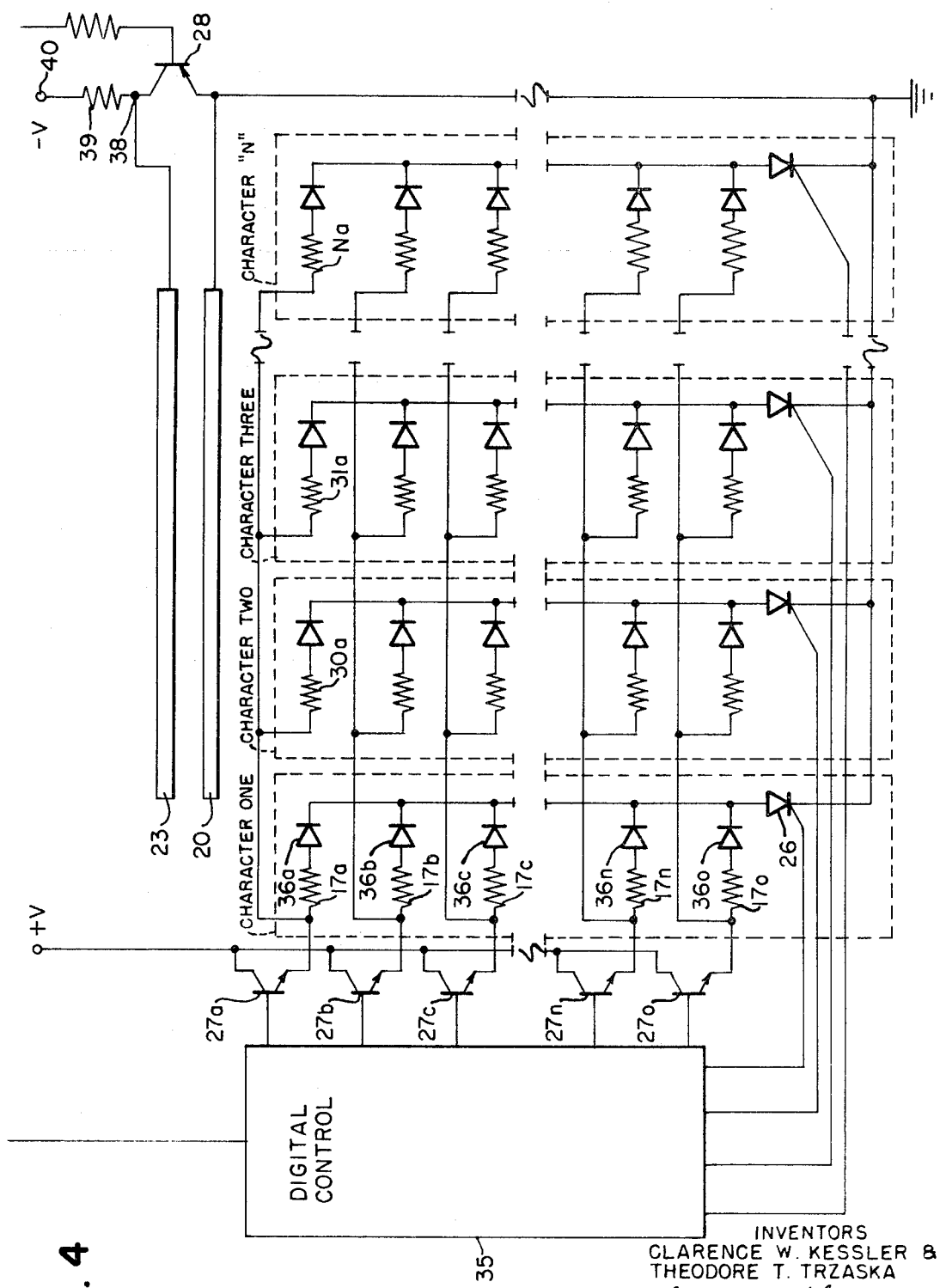
FIG. 4 is a schematic diagram illustrating one form of controlling the heating elements and the field electrodes.

For a better understanding of the invention, reference is now made to FIG. 1, which illustrates the display device 10 as viewed by a human observer, and to FIGS. 2 and 4.

A plurality of thin-film thermal heating elements 17, 30, 31 . . . N, formed of a high-resistance material such as tantalum, are positioned on a substrate 18, in any desired configuration, by conventional deposition techniques. The spacing between the thermal heating elements is such that the elements are electrically and thermally isolated from each other. The substrate 18 may be formed of a material having high electrical resistant qualities and good thermal insulating qualities, such as glass or alumina. The thermal elements in the described embodiment are positioned in an array resembling a matrix (i.e., rows and columns) although not necessarily restricted thereto. In the illustrated embodiment (FIG. 1), there are five thermal heating elements to a column, where three columns are required to form one character. The number of thermal heating elements in a row is determined by the number of characters desired, it being understood, of course, that the number of heating elements in each row and column can be increased or decreased, depending upon the requirements of the user. The thermal heating elements are each individually connected to an electrical source and are isolated from one another by a thin insulating layer 19. The layer 19 may be formed of glass. A conductive layer of tantalum or other suitable material is uniformly deposited over the entire surface area of the glass layer 19 and functions as one field electrode 20. The surface 20a of the field electrode 20 not in contact with the glass layer 19 (second surface) is oxidized for the purpose of providing a dark background.

A thin layer of encapsulated liquid crystals 21 is conventionally applied to the oxidized surface of the tantalum layer 20 as a coating simply by spraying from an emulsion of the encapsulated liquid crystal material in a transparent polymeric binder. One form of encapsulated liquid crystals successfully utilized in the invention consisted of 70 percent cholesterol nonanoate, 25 percent cholesterol chloride, and 5 percent cholesterol cinnamate. It was found that liquid crystals having the above composition, when encapsulated, exhibited properties not found in unencapsulated liquid crystals of the same composition. It was further discovered that the above-described liquid crystals, when encapsulated, shift to one stable chromatic state (translucent) when subjected to an electric field and remain in that state after removal of the field. It was also found that they shift from the translucent chromatic state to a second chromatic state (opaque) when heated above their clear point and then cooled below their clear point. The cooled encapsulated liquid crystal material remains in the opaque state until made translucent by being again subjected to an electric field. This stability (ability to remain either in an opaque state or in a translucent state) lends itself quite well for the display and storage of visual information.

The encapsulated liquid crystal layer 21 is covered with a flexible glass plate 22, which has a transparent conductor 23 applied thereon. This transparent conductor 23 functions as a field electrode and can be formed of any transparent conductive material; e.g., a metal deposit thin enough to be transparent and thick enough to be conductive. For satisfactory results, the conductor 23 should cover an area equal to that covered by the encapsulated liquid crystals 21. Representative materials that could be used for the transparent conductor 23 are gold, tin oxide, etc., all of which can be applied to the glass surface 22 by conventional deposition or coating techniques. The glass plate 22 is placed on the encapsulated liquid crystal layer in such a manner that the transparent conductor is in intimate contact with the encapsulated liquid crystal layer 21. However, the device can operate with the transparent conductor 23 separated from the liquid crystal layer 21 by the glass plate 22, if desired. The entire assembly is sealed by glass solder or glass cement, thereby forming a hermetic structure, which precludes the entry of any impurities into the liquid crystal layer 21.

The substrate 18 and its amalgamated structure are positioned on a heat stabilizer unit 11, which may be fabricated from a material capable of conducting heat, such as aluminum. The heat stabilizer unit 11, in this instance, comprises two layers of aluminum 12 and 14 and a resistive heating element 13. The layers are held together by conventional means such as fasteners 15. Bonded to the heat stabilizer unit 11 is a temperature-sensing element 16, which may be a conventional thermistor. The heat stabilizer unit serves to establish a reference temperature, so that the power required by each thermal heating element necessary to cause adjacent encapsulated liquid crystals to pass through their transition state into an isometric liquid remains substantially constant.

In operation, the areas of the encapsulated liquid crystal layer selected for the display are heated to their clear point by selected thermal elements 17, 30, 31 . . . N. The heat necessary to raise the temperature of the encapsulated liquid crystals past their transition state into an opaque state is determined by the clear point of the liquid crystal material used, and the heat requirement for any given area of the display is the same as that required for any other area, since the entire encapsulated liquid crystal layer 21 is held at a constant temperature by the heat stabilizer unit 11 (FIG. 3).

Figure 3:
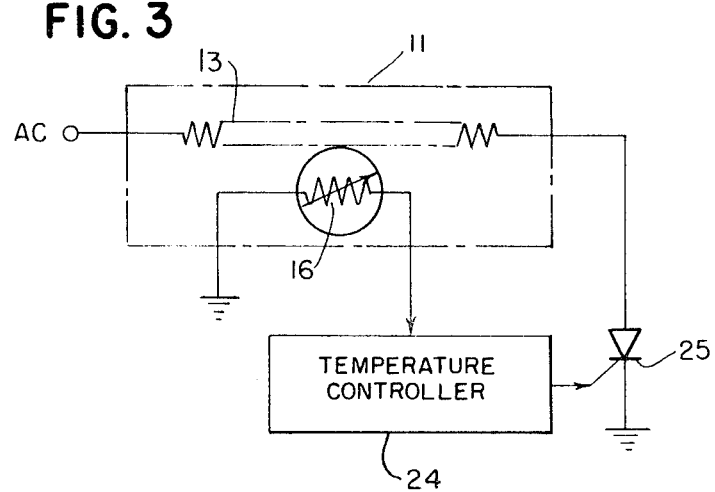
FIG. 3 is a schematic diagram illustrating one form of constant temperature control for the display device.

Referring to FIG. 3 in order to obtain better understanding of the heat stabilizer unit 11, the heating element 13 is connected to an AC source at one end and to the anode of a driver 25, which may take the form of a suitable signal-translating device, such as a silicon controlled rectifier, at the other end. The cathode of the driver 25 is connected to ground, and the gate is connected to a temperature controller 24. The thermistor 16 is connected to ground at one end and to the temperature controller 24 at the other end. When the temperature is less than a predetermined magnitude, the signal transmitted by the thermistor 16 will be such that the controller 24 will pulse the driver 25 into conduction, thus causing a current flow through the heating element 13, which raises the temperature of the display device 10. If the temperature level of the display device 10 attempts to increase above a predetermined magnitude, the driver 25 will be prevented by the controller 24 from being rendered conductive, in which case the display device 10 is cooled by the natural dissipation of heat.

While the temperature controller 24 may take any suitable form, it can be implemented quite satisfactorily with a typical temperature controlling circuit found in most SCR application manuals, more particularly such as found on page 118 of the G. E. SCR Manual Second Edition. The constant temperature of the encapsulated liquid crystal layer facilitates the dynamic operation of the display in the event that such is desired, since the power requirements for each thermal heating element remain constant.

FIG. 4 illustrates a typical electrical circuit arrangement utilized in operating the display device 10. It should be noted that it is not necessary for the electrical circuit arrangement to correspond to the physical arrangement shown in FIG. 1, since the thermal elements 17, 30, 31 . . . N can be connected and controlled in any manner desired. The illustrated circuit arrangement is designed to drive a display of "N" characters. It will be understood that the characters may represent alphabetic, numeric, or alphanumeric characters, dependent upon the selected thermal elements. In the illustrated embodiment, each character has a maximum of 15 associated thermal elements 17a–17o, 30a–30o, 31a–31o, . . . Na–No. The thermal elements of each character are electrically paralleled with respect to each other. Corresponding thermal elements of each character are in parallel with each other; e.g., the thermal elements 17a, 30a, 31a, . . . Na are all connected in parallel. For purposes of simplicity and brevity, only the operation of the character labeled "one" in FIG. 4 will be discussed. The character "one" is composed of 15 thermal elements 17a–17o arranged in three columns (FIG. 1). The electrical connections can be better understood by referring to FIG. 4. The thermal element 17a is connected to the emitter of an element select driver 27a, which may be a transistor. The collector of the driver 27a is connected to a positive voltage source (+V), and the base is connected to a control device 35, which may be a conventional digital computer or other suitable output or encoding device. The other end of the thermal element 17a is connected to the anode of a diode 36a, for the prevention of any sneak paths. The cathode of the diode 36a is connected to the anode of a character select driver 26, represented by a silicon controlled rectifier. The gate of the character driver 26 is connected to the control device 35, and the cathode of said driver is grounded. The remaining thermal elements of character "one" and of the other characters of the display 10 are similarly connected.

The field electrode 23 is connected to a load resistor 39 and to the collector of a transistor 28 at the junction 38. The other end of the resistor 39 is connected to a negative voltage (−V) source 40. The field electrode 20 is connected to the grounded emitter of the transistor 28, and the base of the transistor 28 is connected to the control device 35.

Prior to writing the desired information on the display device, the entire encapsulated liquid crystal layer 21 is rendered translucent by the application of a potential between the field electrodes 20 and 23, which are momentarily energized upon the application of a pulse to the base of the transistor 28. In order to write information on the display medium, it is necessary to erase areas of translucency corresponding to the desired character from the display medium. For example, in displaying the letter "L," it is necessary to apply heat to the encapsulated liquid crystals immediately adjacent to the heating elements 17a–17g of the character 1. This is accomplished by pulsing the character select driver 26 into conduction and simultaneously pulsing the element select driver transistors 27a–27g into conduction, thereby establishing a current in each of the thermal heating elements 17a–17g of a magnitude sufficient to raise the temperature of the adjacent encapsulated liquid crystals above their clear point.

The encapsulated liquid crystals, upon cooling below their clear point, will transform into a light-reflecting opaque area resembling the letter "L." The specific composition of the encapsulated liquid crystals determines the wavelength of the light that will be reflected by the opaque surface and therefore manifested as a color in the eyes of a viewer. In the instant embodiment, the characters displayed will appear green when subjected to normal incident light. The portion of the encapsulated liquid crystal layer not rendered opaque by the selected heating elements retains its translucency and permits the greater portion of incident light to pass therethrough to be absorbed by the dark surface 20a provided by the oxidized tantalum surface of the electrode 20. Therefore, the green characters would be observed on a dark, almost black, background, providing a readily discernible display. The dark background is not shown in FIG. 1, so as not to obscure the drawings.

It can be seen (FIG. 4) that the generation of the characters for the entire display can be written into the display by sequentially energizing one character select driver at a time along with the associated thermal heating elements forming the particular character desired.

In order to aid those skilled in the art in the practice of this invention, the following information is given by way of exemplification only. The substrate 18 has a thickness of 0.03 inch. The tantalum thermal heating elements are applied to the substrate 18 by vacuum deposition techniques to a thickness of 1.5 microns. The tantalum field electrode 20 has a thickness of 2 microns, of which approximately 1 micron is oxidized, thereby providing a dark background. The encapsulated liquid crystals 21 are sprayed on the oxidized surface of the tantalum electrode 20 to a thickness of 0.002 inch and adhere to the glass layer 19 because of the adhesive binders contained in the emulsion. The clear point of the encapsulated liquid crystals 21 is substantially 75° C. The thickness of the protective substrate 22 is not critical, the only requirement being that it be transparent. A pulse of 250 milliseconds' duration with an amplitude of 1,000 volts is sufficient to transpose the encapsulated liquid crystals into a translucent state. The power required for each thermal heating element is determined by the difference between the clear point of the particular encapsulated liquid crystal material used and the reference temperature provided by the heat stabilizer unit 11. The power requirement occurs once if a permanent display is desired, thereby resulting in a display having no power loss after the initial writing.

What is claimed is:

1. A visual display device with memory, comprising:
   a layer of electrostatically and thermally sensitive material having the property of being rendered translucent when subjected momentarily to an electrostatic field and the property of being rendered opaque when subjected to heat and subsequent cooling thereof;
   a plurality of first and second field electrodes, with at least one field electrode intimately positioned on either side of said layer of electrostatically and thermally sensitive material;
   an array of high-resistance thermal heating elements positioned immediately adjacent to said first field electrode;
   means for energizing said field electrodes, thereby establishing an electrostatic field for rendering said electrostatically and thermally sensitive material translucent;
   means for establishing a current in selected ones of said thermal heating elements for raising the temperature level thereof and thereby altering the light-reflecting properties of those portions of said electrostatically and thermally sensitive material which are in close proximity to said selected heating elements; and
   heat stabilizing means for maintaining said electrostatically and thermally sensitive material at a substantially constant reference temperature.

2. The device as described in claim 1 wherein said electrostatically and thermally sensitive material comprises encapsulated liquid crystals.

3. The device as described in claim 1 wherein said second field electrode is transparent.

4. The device as described in claim 1 wherein a said heat stabilizing means comprises a temperature-sensing element in contact with said visual display device, a display heating element, and a temperature controller operated by said temperature-sensing element and capable of selectively applying current to said display heating element.

5. A visual display device with memory, comprising:
   a substrate;
   a plurality of high-resistance thermal heating elements positioned on said substrate;
   a thin layer of dielectric material overlying said thermal heating elements;
   a first field electrode overlying said dielectric material;
   a layer of electrostatically and thermally sensitive material, overlying said field electrode, having the property of being rendered translucent when subjected momentarily to an electrostatic field and the property of being rendered opaque when raised to a temperature at least equal to the clear point of said material and the subsequent cooling thereof;
   a transparent field electrode overlying said layer of electrostatically and thermally sensitive material;
   a transparent protective covering overlying said transparent field electrode;
   means for energizing said field electrode, thereby establishing an electrostatic field for rendering said electrostatically and thermally sensitive material translucent;
   means for establishing a current in selected ones of said thermal heating elements for raising the temperature level of those portions of said electrostatically and thermally sensitive material which are in close proximity to said selected heating elements, thereby altering the light-reflecting properties of said electrostatically and thermally sensitive material;
   and heat stabilizing means for maintaining said electrostatically and thermally sensitive material at a substantially constant reference temperature.

* * * * *